(12) United States Patent
Heo

(10) Patent No.: US 12,448,218 B2
(45) Date of Patent: Oct. 21, 2025

(54) FRICTION ROLLER FOR CONVEYOR

(71) Applicant: Gye Yong Heo, Gimhae-si (KR)

(72) Inventor: Gye Yong Heo, Gimhae-si (KR)

( * ) Notice: Subject to any disclaimer, the term of this patent is extended or adjusted under 35 U.S.C. 154(b) by 78 days.

(21) Appl. No.: 18/537,866

(22) Filed: Dec. 13, 2023

(65) Prior Publication Data

US 2024/0101353 A1    Mar. 28, 2024

Related U.S. Application Data

(63) Continuation of application No. PCT/KR2022/007934, filed on Jun. 3, 2022.

(30) Foreign Application Priority Data

Jul. 27, 2021 (KR) .......................... 10-2021-0098591

(51) Int. Cl.
*B65G 39/12* (2006.01)

(52) U.S. Cl.
CPC .................... *B65G 39/12* (2013.01)

(58) Field of Classification Search
None
See application file for complete search history.

(56) References Cited

U.S. PATENT DOCUMENTS

| | | | |
|---|---|---|---|
| 5,025,917 A * | 6/1991 | Smith | F16C 13/022 384/480 |
| 5,433,308 A * | 7/1995 | Gagnon | B29D 99/0035 193/37 |
| 8,763,778 B2 * | 7/2014 | Lemay | B65G 39/09 492/47 |

FOREIGN PATENT DOCUMENTS

| | | |
|---|---|---|
| JP | 3045022 U | 1/1998 |
| JP | 2017-024839 A | 2/2017 |
| KR | 10-1226101 B1 | 1/2013 |
| KR | 10-1241077 B1 | 3/2013 |
| KR | 10-1849006 B1 | 4/2018 |
| KR | 102214089 B1 * | 2/2021 ............. F16C 33/38 |
| KR | 10-2261830 B1 | 6/2021 |

OTHER PUBLICATIONS

International Search Report of PCT/KR2022/007934 mailed Aug. 18, 2022.

* cited by examiner

*Primary Examiner* — Kavel Singh
(74) *Attorney, Agent, or Firm* — Revolution IP, PLLC

(57) ABSTRACT

A friction roller for conveyor, includes: a shaft; a sprocket which is rotatably coupled to the shaft and has a retainer coupled to the front of a sprocket body; and a conveyor roller comprising a plurality of rotating balls which are located among a plurality of rotating protrusions protruding forwardly from a retainer body of the retainer, an inner wheel body which is fixed to the shaft and has the outer circumferential surface coming into contact with the rotating balls, and an outer wheel body which comes into contact with the outer circumferential surfaces of the rotating balls 111 and rotates by the rotation of the rotating balls.

9 Claims, 11 Drawing Sheets

FRICTION ROLLER FOR CONVEYOR

TECHNICAL FIELD

The present invention relates to a friction roller for conveyer. More specifically, the present invention relates to a friction roller for conveyor capable of smoothly conveying objects to be conveyed without increasing the output of the motor even when the object being conveyed by a friction roller is heavy, and preventing the sprocket and motor for driving the sprocket from being overloaded when the object to be conveyed is stopped by a stopper, thereby preventing wear of the shaft and damage to the driving motor and sprocket.

BACKGROUND ART

In general, a conveyor for transporting objects to be conveyed such as parts or finished products in a manufacturing plant or logistics warehouse has a plurality of shafts and conveying rollers or a conveying belt rotated by a driving motor installed to transport the object.

Among these objects to be conveyed, conveyors for conveying objects by placing the objects on a rotating friction roller are widely used. The friction roller used in such conveyors is configured so that the driving motor and shaft rotate continuously. The friction roller has the advantages of reducing the power consumption of the driving motor and at the same time reducing wear and damage to the device.

Prior art for such friction rollers is disclosed in Korean Patent No. 10-1241077 which discloses a technology relating to a "conveyor with friction roller" configured to regulate friction force.

The friction roller in prior art comprises a roller pierced by a shaft and in direct contact with an object to be conveyed, a bush formed on the end face of the roller, a spring applying an elastic force to the bush, and a level block regulating the elastic force of the spring. The friction roller has problems such that the friction force with the roller that is in surface contact with the lower surface of the object needs to be regulated individually by the elastic force of the spring according to the load of the object conveyed, and thus the work is troublesome, it takes a long time for resetting to regulate the friction force, and thus the time incurred to convey the object and the entire process are delayed, thereby degrading productivity, and deteriorating the function or reducing durability by wear of the conveyor.

In addition, Korean Patent No. 10-1849006 discloses a "friction roller for conveyor" and Korean Patent No. 10-2214089 discloses a "friction roller for maintaining the braking force of the outer ring body of ball bearings used in conveyors."

In the above two prior art, in the event of a load such as stopping of an object being applied while conveying a heavy object using a retainer, the retainer is used to keep the braking force of the outer wheel body rubbed against the object constant while the inner wheel body fixed to the shaft is continuously rotated along the rotation of the shaft, thereby preventing the transmission of overload to the driving motor and the shaft side.

However, since a plurality of shafts installed at regular intervals on the frame configuring the conveyor rotates together with the sprocket rotated by the driving motor, more power is required to drive the driving motor, and noise may be generated by friction with the frame in which the shaft is insertedly installed. In particular, when the shaft, and the inner wheel body and retainer fixed to the shaft rotate together, the outer circumferential surface of the shaft may wear out when used for a long period of time, shortening the durability of the conveyor and deteriorating the conveyor function.

In addition, since the shaft continues rotating while the conveying of the object is stopped by the stopper, even when the object is stopped by the sprocket and retainer rotating therewith by the load of the object and friction with the roller, a force moving the object to the stopper may be generated, causing the stopper to be overloaded. Thus, there are always problems such that the stopper and object may be damaged.

In this regard, the present inventor would like to suggest a new type of friction roller for conveyor that overcomes the various problems of the conventional friction rollers.

DETAILED DESCRIPTION

Technical Task

It is an object of the present invention to provide a friction roller for conveyor capable of enabling smooth transportation of an object to be conveyed regardless of the load of the object while reducing power consumption for driving the conveyor through a simple structure.

It is another object of the present invention to provide a friction roller for conveyor capable of reducing wear of the shaft and inner wheel body and at the same time reducing noise generated therebetween by conveying the object through the rotation of the outer wheel body while the shaft and the inner wheel body of the roller fitted on the shaft are stopped.

It is yet another object of the present invention to provide a friction roller for conveyor capable of flexibly stopping the operation of the conveyor roller when the object is stopped by the stopper and preventing damage to the stopper.

The above and other inherent objects of the present invention may all be easily achieved by the description of the present invention described below.

Means for Solving Technical Task

The friction roller for conveyor according to the present invention comprises: a shaft 50; a sprocket 40 which is rotatably coupled to the shaft and has a retainer 140 coupled to the front of a sprocket body 41; and a conveyor roller 110 comprising a plurality of rotating balls 111 which are located among a plurality of coupling protrusions 141A protruding forwardly from a retainer body 141 of the retainer 140, an inner wheel body 112 which is fixed to the shaft 50 and has the outer circumferential surface coming into contact with the rotating balls 111, and an outer wheel body 113 which comes into contact with the outer circumferential surfaces of the rotating balls 111 and rotates by the rotation of the rotating balls 111.

In the present invention, preferably, a bearing stopper 41B protruding in the direction of the shaft 50 is formed along the inner circumferential surface of the sprocket body 41, and a second bearing 130 is installed at a rear end of the bearing stopper 41B.

In the present invention, preferably, a first bearing 120 is installed at a front end of the bearing stopper 41B.

In the present invention, preferably, a spring S supported at a rear end of the inner wheel body 112 is installed, and the rear end of the spring S is supported at a front end of the first bearing 130.

In the present invention, preferably, a spring S supported at a rear end of the inner wheel body 112 is installed, and the rear end of the spring S is supported at a front end of the bearing stopper 41B.

In the present invention, preferably, an inclined surface 142A inclined in the direction of the shaft 50 is formed at both sides of the coupling protrusion 141A.

In the present invention, preferably, a first curved groove 112 is formed on an outer circumferential surface of the inner wheel body 112, and a second curved groove 113A is formed on an inner circumferential surface of the outer wheel body 113 along a revolving path of the rotating ball 111.

In the present invention, preferably, the retainer 140 is formed from a plastic injection molded material.

In the present invention, preferably, the retainer 140 is formed integrally with the sprocket 40 by insert injection molding.

A conveyor, wherein a plurality of the friction rollers 100 for conveyor according to the present invention is installed on a horizontal frame 10 at regular intervals is included in the present invention.

Effect of Invention

The present invention has an effect of enhancing the rotation force of the outer wheel body having a larger diameter than the inner wheel body of the conveyor roller, and accordingly, increasing the conveying speed of the object conveyed along the outer circumference, thereby rapidly and smoothly conveying the object, by using the friction force caused by the contact of the outer wheel body of the conveyor roller with the object and the load of the object, while allowing the outer wheel body to rotate by the rotating ball rotating along the rotation of the driving protrusion of the retainer.

The present invention is capable of reducing wear of the shaft and bearing and extending the lifetime of the conveyor by smoothly rotating the outer wheel body of the conveyor roller in a state where the inner wheel body of the conveyor roller, first and second bearings of the sprocket, and shaft are stopped.

The present invention has an effect of reducing power consumption for driving a conveyor by rotating a sprocket and a conveyor roller in a state where the shaft is fixed to a frame, and preventing the frame and shaft from being out of alignment by keeping the shaft in a state fixed to the frame, thereby reducing the noise generated while driving the conveyor and at the same time preventing damage to the frame.

The present invention has an effect of preventing damage to the stopper by rotating only the rotating ball of the conveyor roller by the driving protrusion of the retainer when the object is stopped by the stopper, allowing the sprocket coupled to the retainer to rotate together with the rotating ball, so that the sprocket and the driving motor are not overloaded, and the shaft and the inner wheel body are kept in a stopped state, thereby suppressing the force of the object moving towards the stopper side.

Hereinafter, the present invention will be described in detail with reference to the accompanying drawings.

BEST MODE FOR CARRYING OUT THE INVENTION

Figure 1:
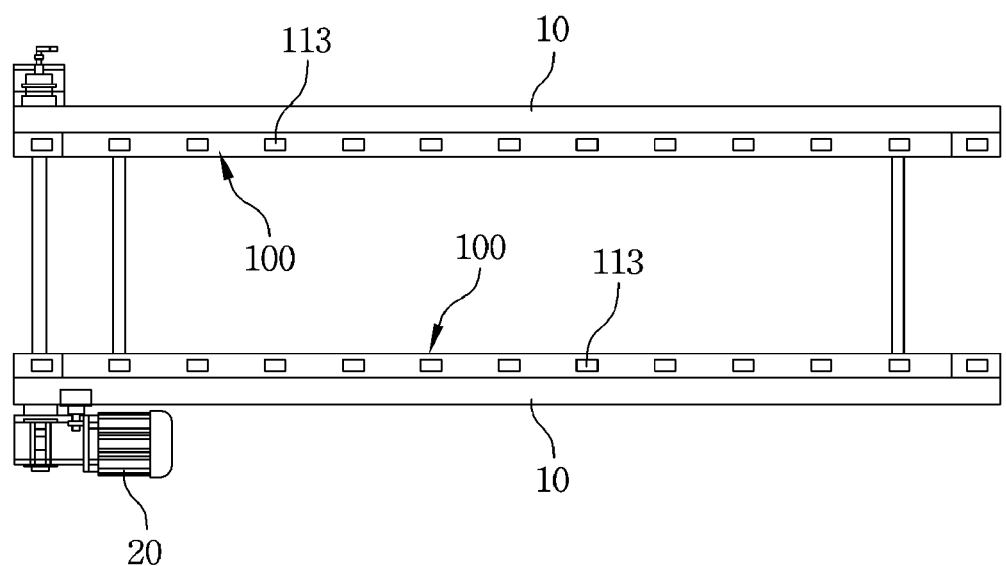
FIG. 1 is a plan view illustrating a conveyor using a friction roller for conveyor according to the present invention.
Figure 2:
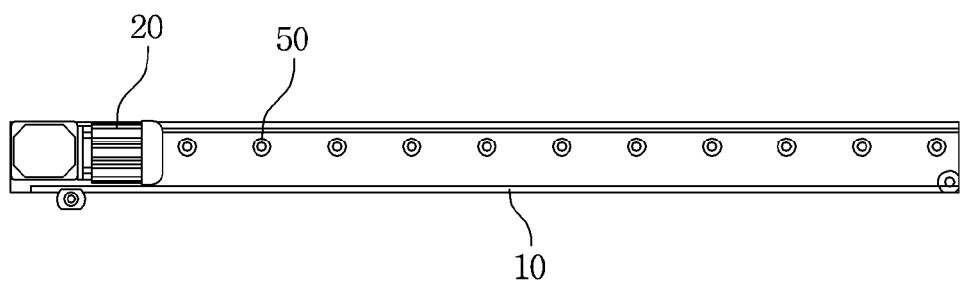
FIG. 2 is a side view illustrating a conveyor using a friction roller according to the present invention.
Figure 3:
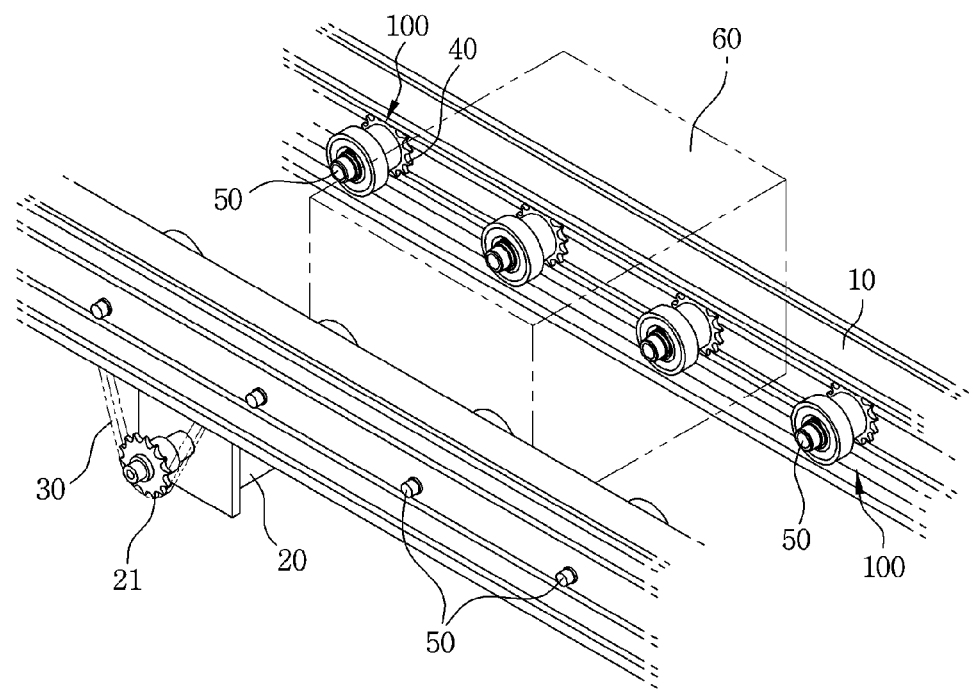
FIG. 3 is a perspective view illustrating a state in which a friction roller for conveyor according to the present invention is installed on a conveyor.

FIG. 1 is a plan view illustrating a conveyor using a friction roller 100 for conveyor according to the present invention. FIG. 2 is a side view. FIG. 3 is a perspective view illustrating a state in which a friction roller 100 for conveyor according to the present invention is installed on a conveyor.

A plurality of friction rollers 100 of the present application is installed at regular intervals on each of a pair of horizontal frames 10 provided in parallel in the conveyor. A driving motor 20 is installed on one side of the horizontal frame 10. When a driving sprocket 21 driven by the driving motor 20 rotates, a sprocket 40 of the friction roller 100 rotates together with the driving sprocket 21, interlocked by a chain 30 installed on the sprocket 40. As such, the friction rollers 100 according to the present invention are installed at regular intervals on the horizontal frame 10 of the conveyor to be applied for conveying the object.

Figure 4:
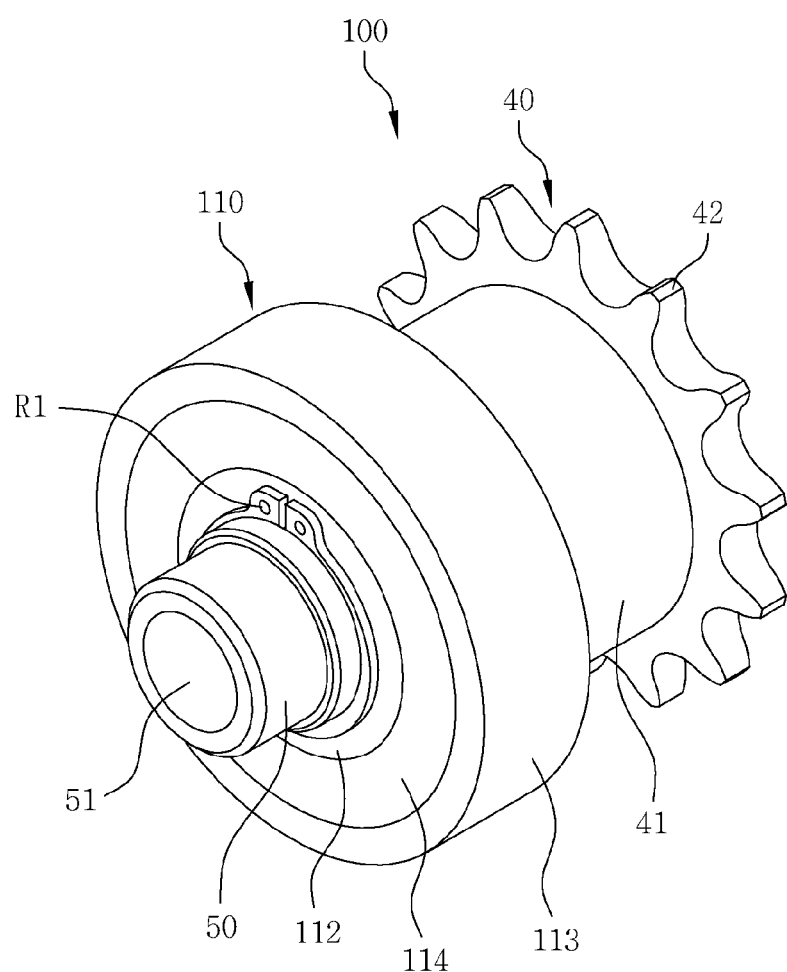
FIG. 4 is a perspective view illustrating a friction roller for conveyor according to the present invention.

FIG. 4 is a perspective view illustrating a friction roller 100 for conveyor according to the present invention. As illustrated in FIG. 4, the friction roller 100 according to the present invention comprises a sprocket 40, a shaft 50 and a conveyor roller 110.

The sprocket 40 comprises a sprocket body 41 and teeth 40 radially protruding from an end on one side of the sprocket body 41. The teeth 42 are coupled to the chain so that the sprocket body 41 rotates when the chain is driven. As long as the teeth 42 of the present invention is configured to drive the rotation of the sprocket body 41, it may have the shape of gear or other power transmission means, not a shape to be coupled to the chain. The sprocket rotates as its rotation is supported by a shaft 50 fixed to the horizontal frame 10.

The conveyor roller 110 is rotatably installed on the shaft 50. The conveyor roller 110 comprises an inner wheel body 112 coupled to the shaft 50, an outer wheel body 113 located on an outer side of the inner wheel body 112, and a cover 114 located between the inner wheel body 112 and the outer wheel body 113.

The inner wheel body 112 is coupled to the shaft 50, with one end at the front side of the inner wheel body 112 supported by a first snap ring R1 coupled to the shaft 50, and the other end at the rear side of the inner wheel body 112 pressed by a spring S. Thus, the inner wheel body 112 is fixedly coupled to the shaft 50 without rotation. The first snap ring R1 serves to prevent the inner wheel body 112 from deviating from its original position, and thus a protrusion, instead of the first snap ring R1, may be formed on the shaft 50 at the front side.

In a space between the inner wheel body 112 and the outer wheel body 113, a plurality of rotating balls 111 are installed to come into contact with the outer circumferential surface of the inner wheel body 112 and the inner circumferential surface of the outer wheel body 113. A cover 114 serves to prevent the rotating balls 111 from being exposed to the front side, and is located not to interfere with the rotation of the outer wheel body 113.

When the sprocket 40 rotates, the rotating ball 111 rotates between the inner wheel body 112 and the outer wheel body 113 and simultaneously revolves around the inner wheel body 112. In case an object to be conveyed is placed on the outer circumferential surface of the outer wheel body 113, the friction force between the rotating ball 111 and the inner wheel body 112 and the outer wheel body 113 increases by the load of the object, thereby amplifying the driving force of the sprocket 40 to the outer wheel body 113, allowing the object to move. A more detailed structure in this regard will be described with reference to FIG. 5 in the following.

Figure 5:
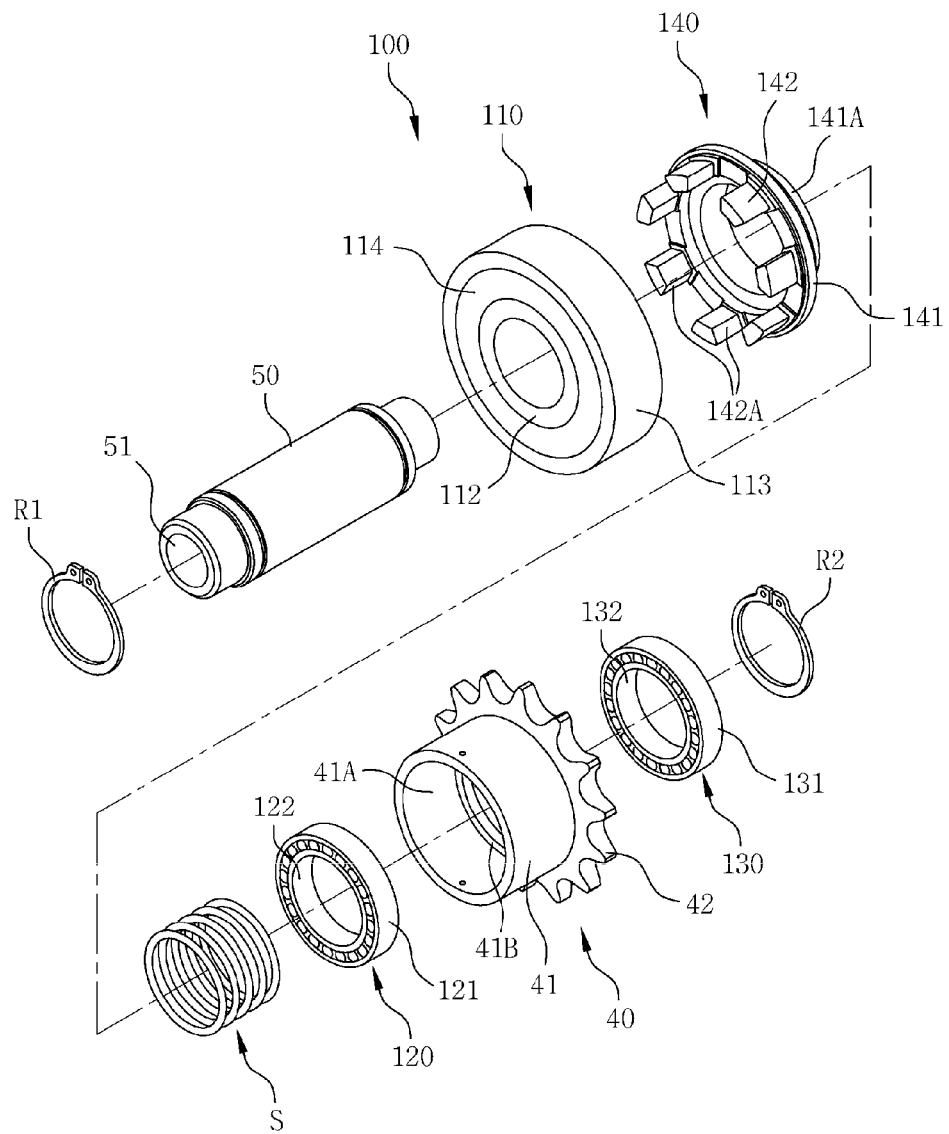
FIG. 5 is an exploded perspective view illustrating a friction roller for conveyor according to the present invention.
Figure 6:
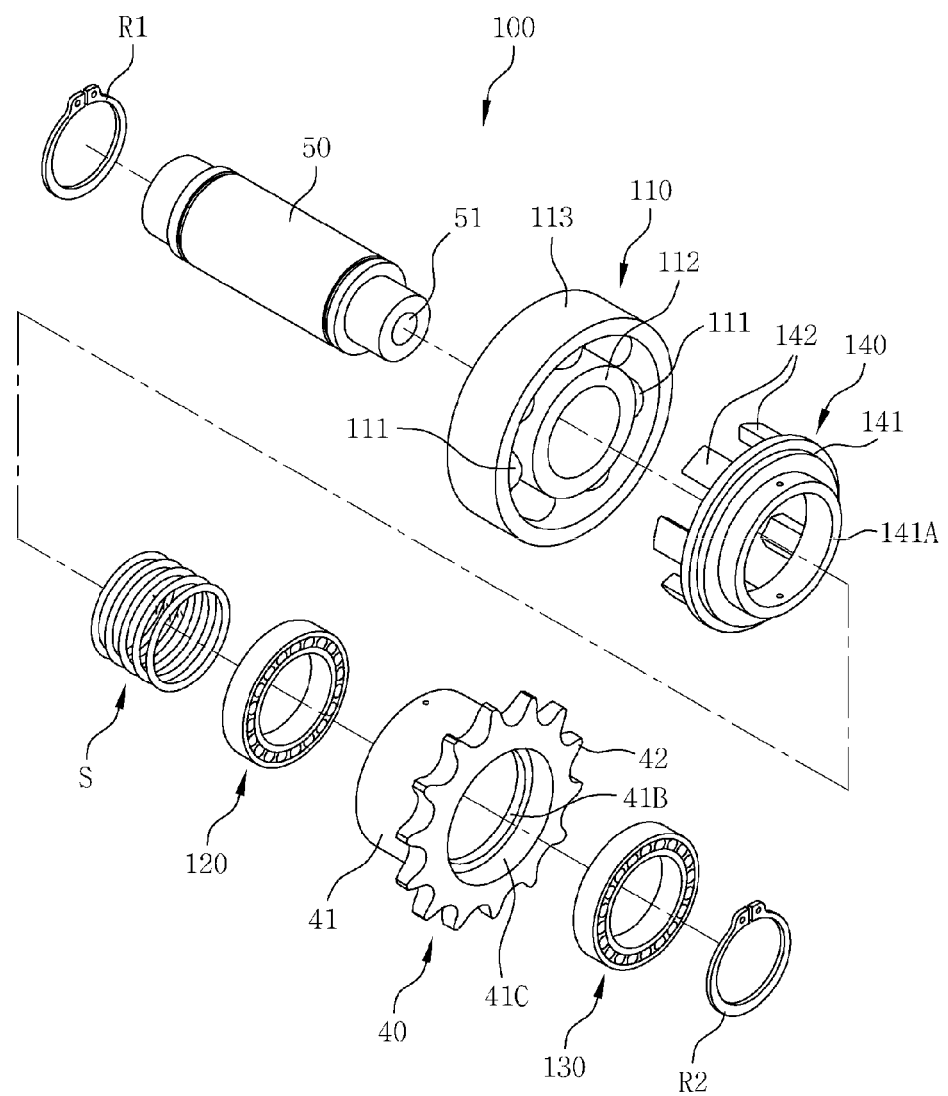
FIG. 6 is an exploded perspective view illustrating a friction roller for conveyor according to the present invention, viewed from the opposite side of FIG. 5.
Figure 7:
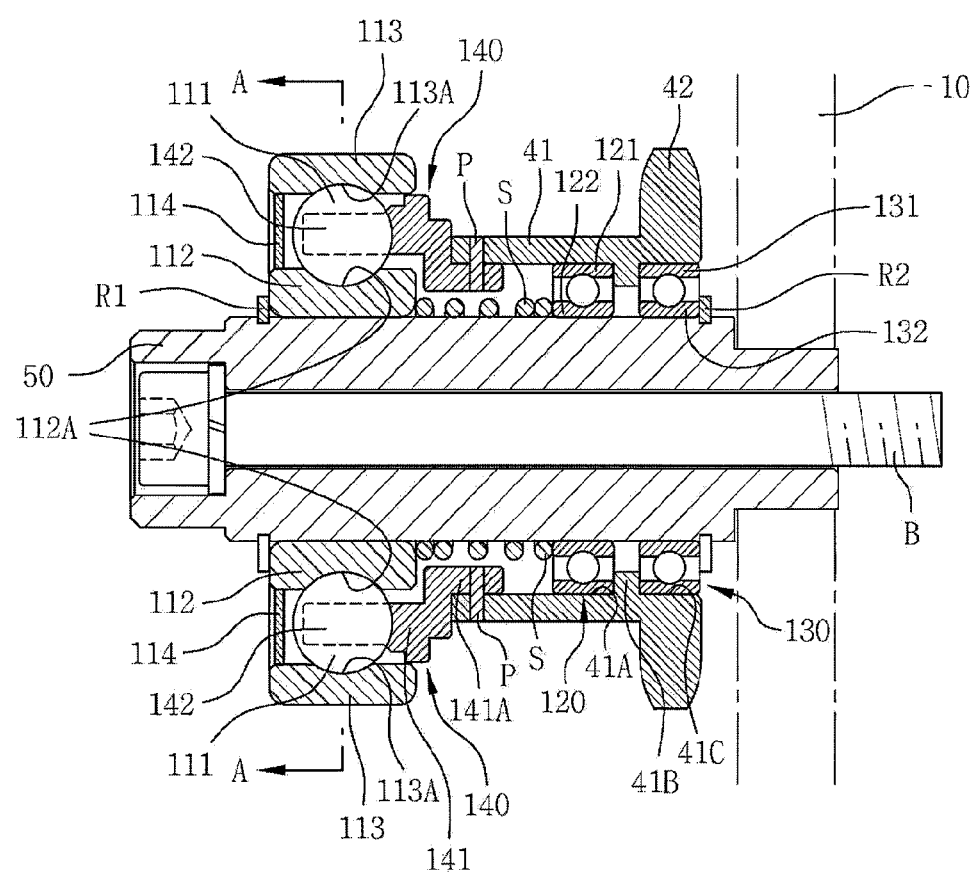
FIG. 7 is a cross-sectional view illustrating a friction roller for conveyor according to the present invention.
Figure 8:
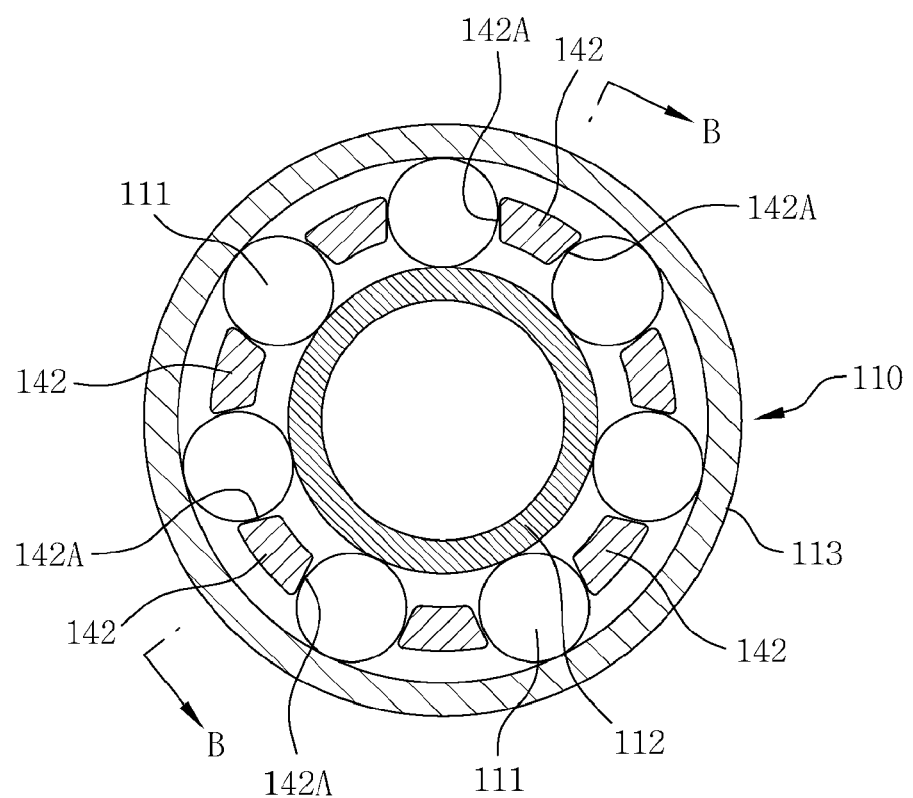
FIG. 8 is a cross-sectional view taken along line A-A in FIG. 7.
Figure 9:
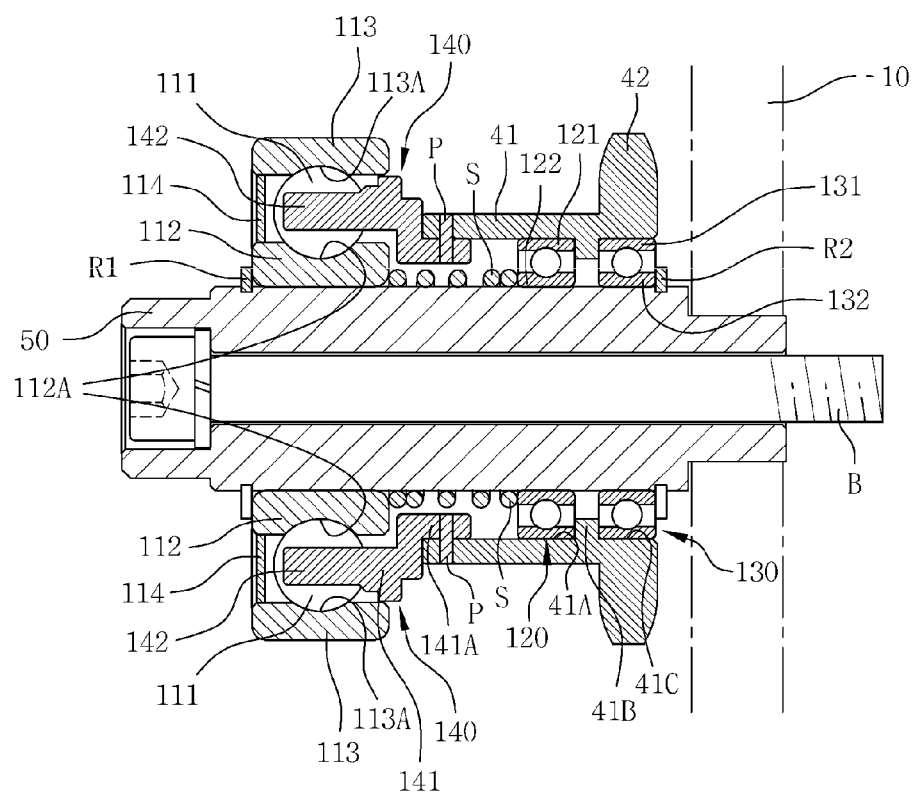
FIG. 9 is a cross-sectional view taken along line B-B in FIG. 8.

FIG. 5 is a front exploded perspective view illustrating a friction roller 100 for conveyor according to the present invention. FIG. 6 is a rear exploded perspective view. FIG. 7 is a cross-sectional view illustrating a friction roller 100 for conveyor according to the present invention. FIG. 8 is a cross-sectional view taken along line A-A in FIG. 7. FIG. 9 is a cross-sectional view taken along line B-B in FIG. 8.

Referring to FIGS. 5 to 9 together, the friction roller 100 according to the present invention comprises a shaft 50, a sprocket 40 installed on the shaft 50, and a conveyer roller 110.

The conveyor roller 110 is provided with an inner wheel body 112 and an outer wheel body 113, and a plurality of rotating balls 111 are located between the inner wheel body 112 and the outer wheel body 113. Preferably, the distance between the outer circumferential surface of the inner wheel body 112 and the inner circumferential surface of the outer wheel body 113 is approximately equal to or slightly larger than the size of the rotating balls 111. A cover 114 is coupled to a front end between the inner wheel body 112 and the outer wheel body 113, the cover 114 being coupled to the outer circumferential surface of the inner wheel body 112 and not touching the inner circumferential surface of the outer wheel body 113 so that the outer wheel body 113 is not interfered by the cover 114 while rotating. The inner wheel body 112 is coupled to the shaft 50 allowing the shaft 50 to pass through the center thereof.

The shaft 50 is fixed to the horizontal frame 10 by a fixing bolt B inserted into a hollow part 51 formed in the center of the shaft 50.

A retainer 140 is coupled to the sprocket 40, and the retainer 140 rotates when the sprocket 40 rotates. The retainer 140 comprises a ring-shaped retainer body 141 having a hollow center part, and a plurality of rotating protrusions 142 protruding forwardly from the retainer body 141. The rotating protrusion 142 is formed by protruding forwardly at regular intervals along the circumference of the retainer body 141, such that a rotating ball 111 is located between two adjacent rotating protrusions 142. Thus, when the retainer body 141 rotates, the rotating ball 111 rotates and simultaneously revolves along the outer circumferential surface of the inner wheel body 112 and the inner circumferential surface of the outer wheel body 113 by the rotating protrusion 142.

The rotating protrusion 142 is formed by protruding forwardly from the retainer body 141, and preferably has an inclined surface 142A inclined in the direction of the shaft 50 at both sides thereof to smoothly push the rotating ball 111.

The sprocket 40 comprises a cylindrical sprocket body 41 which is hollow, and a plurality of teeth 42 radially formed along the outer circumferential surface of the sprocket body 41 at the rear side of the sprocket body 41.

The sprocket 40 is coupled to the retainer 140 to rotate together, with a coupling protrusion 141A protruding rearwardly from the retainer body 141 inserted into the inner side of the front of the sprocket body 41 to be coupled. As illustrated in FIGS. 7 and 9, a pin P may be inserted through a hole formed in the sprocket body 41 and the coupling protrusion 141A to be fixed. However, the coupling is not necessarily limited to the above, and a bolt or another coupling means may be used, or the sprocket 40 and the retainer 140 may be manufactured as an integral member.

On the rear side of the inner circumferential surface of the sprocket body 41, a bearing stopper 41B protruding in the direction of the shaft 50 is formed along the inner circumferential surface of the sprocket body 41. The front of the bearing stopper 41B becomes a first bearing seating part 41A in which a first bearing 120 is installed, and the rear of the bearing stopper 41B becomes a second bearing seating part 42B in which a second bearing 130 is installed. Preferably, the first bearing 120 and the second bearing 130 are ball bearings.

An outer wheel 121 of the first bearing 120 is fixed to the first bearing seating part 41A, and an outer wheel 131 of the second bearing 130 is seated on the second bearing seating part 41C. The inner wheels 122 and 132 of the first bearing 120 and the second bearing 130 are coupled to the shaft 50. Thus, the first bearing 120 and the second bearing 130 allow the sprocket 40 to be rotatably coupled to the shaft 50. Depending on design needs, the first bearing 120 may be omitted and only the second bearing 130 may be provided.

The conveyor roller 110 is coupled to the front side of the shaft 50. The front end of the inner wheel body 112 of the conveyor roller 110 is supported by a first snap ring R1 fixed to the shaft 50, and the rear end of the inner wheel body 112 is supported to be pressed by the spring S. Thus, since the conveyor roller 110 is fixed to the shaft 50, and the inner wheel body 112 of the conveyor roller 110 stays fixed to the shaft 50, the inner wheel body 112 does not rotate, but the rotating ball 111 and the outer wheel body 113 rotate. The first snap ring R1 is inserted into a groove formed at the front side of the shaft 50 to be fixed thereto. Since the first snap ring R1 is provided to support the conveyor roller 110, it may be replaced with another part playing a similar role or with a stopper shape integrally formed with the shaft 50.

The front end of the spring S is supported on the rear side of the inner wheel body 112 of the conveyor roller 100, and the rear end of the spring S is supported on the front end of the inner wheel 122 of the first bearing 120. Thus, the spring S presses the rear end of the inner wheel body 112, and the front end of the inner wheel body 112 is supported by the first snap ring R1, so that the inner wheel body 112 is fixed without rotating in a state coupled to the shaft 50. The rear end of the first bearing 120 is supported by the bearing stopper 41B. If the first bearing 120 is not installed, the rear end of the spring S is supported on the front end of the bearing stopper 41B.

The front end of the second bearing 130 is supported on the rear end of the bearing stopper 41B, and the rear end of the second bearing 130 is supported by a second snap ring R2 fixed to the shaft 50. The second snap ring R2 is inserted into a groove formed at the rear side of the shaft 50 to be fixed thereto. Since the second snap ring R2 is provided to support and fix the second bearing 130, it may be replaced with another part playing a similar role or with a stopper shape integrally formed with the shaft 50.

When the sprocket 40 rotates by an external force, such as a rotational force generated and delivered by a driving motor 20, the retainer 140 coupled to the sprocket 40 rotates, and the rotating protrusion 142 protruding forwardly from the front of the retainer 140 rotates the rotating ball 111. The rotating ball 111 rotates the outer wheel body 113 while rotating along the outer circumferential surface of the inner wheel body 112 of the conveyor roller 110. A first curved groove 112A may be formed on the outer circumferential surface of the inner wheel body 112 along the revolving path so that the rotating ball 111 can revolve smoothly along the outer circumferential surface of the inner wheel body 112. In addition, a second curved groove 113A may be formed on the inner circumferential surface of the outer wheel body 113 along the revolving path so that the rotating ball 111 can revolve smoothly along the inner circumferential surface of the outer wheel body 113. The object placed on an upper part of the outer wheel body 113 is conveyed by rotation of the outer wheel body 113. Detailed operation in this regard will be described in detail in the following.

Figure 10:
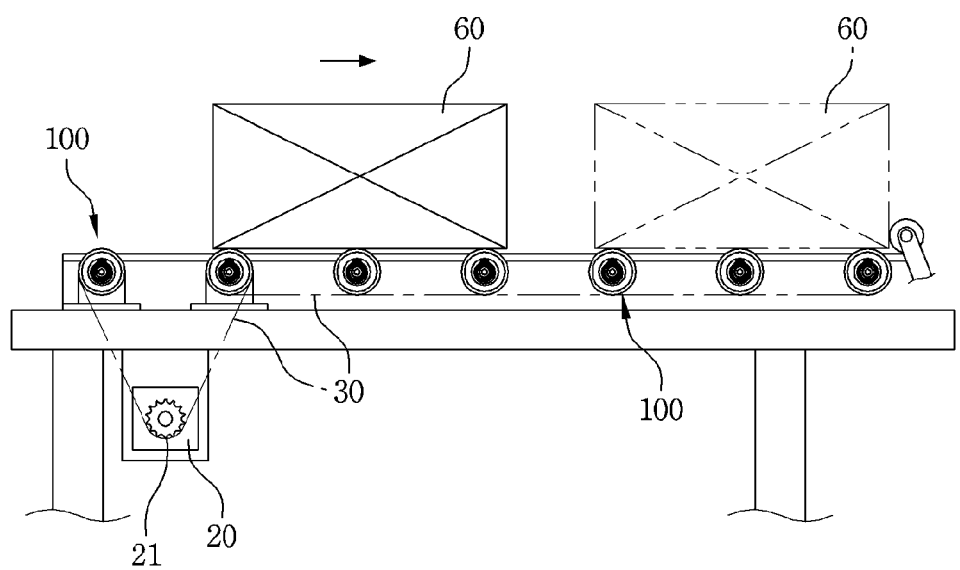
FIG. 10 is a side view illustrating a state in which an object is conveyed through a friction roller for conveyor according to the present invention.
Figure 11:
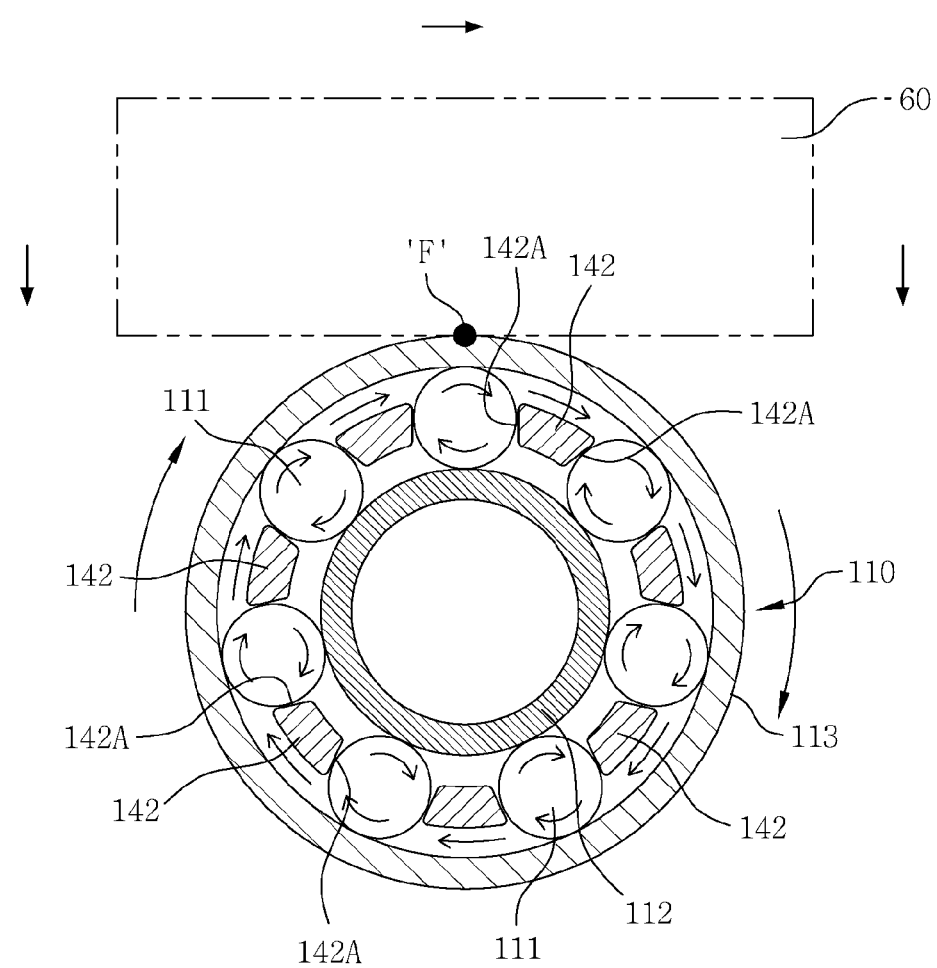
FIG. 11 is a cross-sectional view illustrating a state in which an object is conveyed through a friction roller for conveyor according to the present invention.
Figure 12:
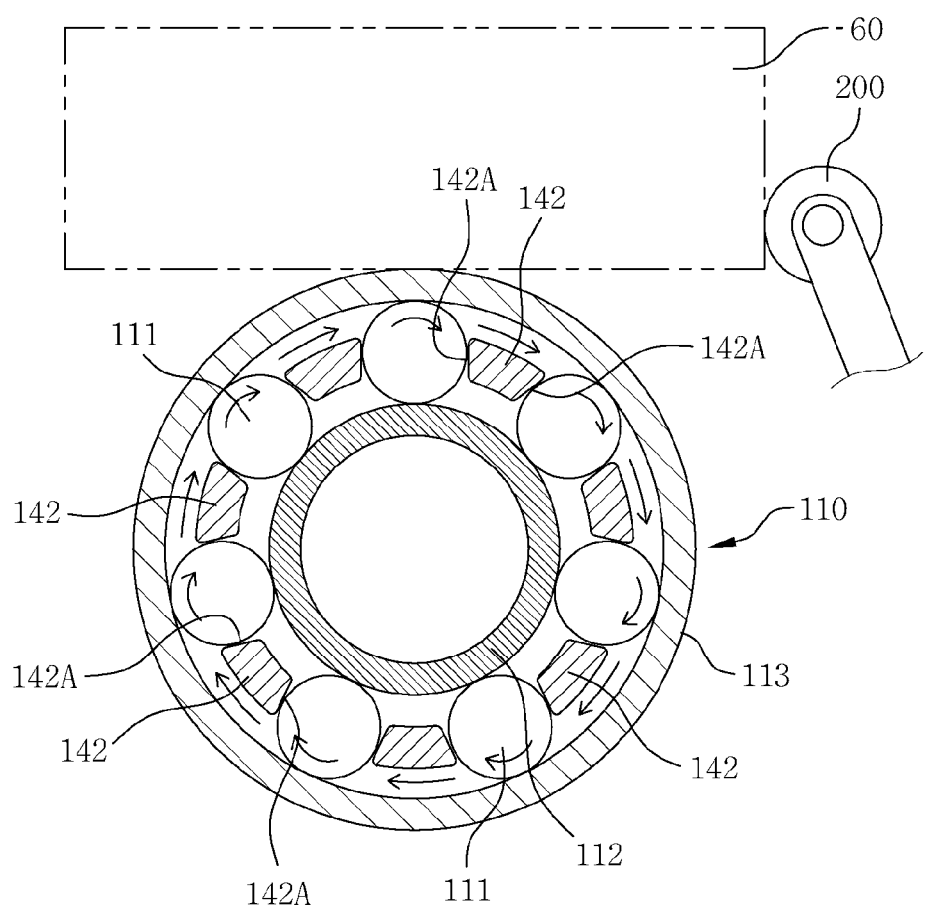
FIG. 12 is a cross-sectional view illustrating a state in which an object conveyed through a friction roller for conveyor according to the present invention is stopped by a stopper.

FIG. 10 is a side view illustrating a state in which an object 60 is conveyed through a friction roller 100 for conveyor according to the present invention. FIG. 11 is a cross-sectional view illustrating a state in which an object is conveyed through a friction roller for conveyor according to the present invention. FIG. 12 is a cross-sectional view illustrating a state in which an object conveyed through a friction roller for conveyor according to the present invention is stopped by a stopper.

Referring to FIGS. 10 to 12 together, a plurality of friction rollers 100 according to the present invention is installed at regular intervals on the horizontal frame 10. An object 60 is placed on an upper part of the friction roller 100 so that the object 60 is conveyed by the rotation of the friction roller 100. The sprocket 40 of each friction roller 100 rotates by the chain 30 operated by the driving of the driving motor 20. When the object 60 is located at a target point on the rear of the horizontal frame 10, the object is stopped by the stopper 200.

When the sprocket 40 rotates, the retainer 140 coupled to the front of the sprocket 40 rotates, so that the rotating protrusion 142 of the retainer 140 rotates to rotate the rotating ball 111. Since the rotating ball 111 is in contact with the outer circumferential surface of the inner wheel body 112 and the inner circumferential surface of the outer wheel body 113, the rotating ball 111 rotates and revolves along the outer circumferential surface of the inner wheel body 112 which is fixed and does not rotate, and the rotation and revolution of the rotating ball 111 causes the outer wheel body 113 to rotate.

Since the rotating ball 111 rotates and revolves, the rotation speed of the outer wheel body 113 increases over the rotation speed of the sprocket 40. The rate of increase is equal to the ratio of the inner diameter circumference of the outer wheel body 113 to the outer diameter circumference of the inner wheel body 112. For example, when the ratio of the inner diameter circumference of the outer wheel body 113 to the outer diameter circumference of the inner wheel body 112 is 2:3, the outer wheel body 113 rotates at 30 PRM when the sprocket 40 rotates at 20 RPM.

As illustrated in FIG. 11, an object 60 may be conveyed along the direction of rotation of the conveyor roller 110 by a friction force generated at point "F" which is a point where the bottom surface of the object 60 comes into contact with the outer wheel body 113 of the conveyor roller 110. The load on the conveyor roller 110 does not significantly affect the outer wheel body 113, the rotating ball 111, and the inner wheel body 112 even when the load of the object 60 increases. Thus, the friction roller 100 according to the present invention may easily convey an object with increased load without increasing the driving power of the sprocket 40.

In addition, the retainer 140 of the sprocket 40 may be formed from a plastic injection molded material rather than a metal material, which may reduce the manufacturing cost and weight. The retainer 140 may be formed by a separate plastic injection molded material to be coupled to the sprocket body 41, or the retainer 140 may be injection molded as an integral part by locating the sprocket body 41 in an insert injection mold.

When the object 60 is conveyed to a target point and stopped by the stopper 200, as illustrated in FIG. 12, the outer wheel body 113 does not rotate and stops. In this case, since the rotating protrusion 142 and the rotating ball 111 located between the outer wheel body 113 and the inner wheel body 112 keep rotating, the friction roller 110 may operate stably without causing wear or damage to the conveyor roller 110 or sprocket 40.

It should be noted that the description of the present invention described above is merely an example for understanding the present invention, and is not intended to limit the scope of the present invention. It should be construed that the scope of the present invention is defined by the appended claims, and all modifications and alternations of the present invention within this scope fall within the protection scope of the present invention.

What is claimed is:

1. A friction roller for conveyor, comprising:
   a shaft (50) fixed to a horizontal frame (10);
   a sprocket (40) which is rotatably coupled to the shaft and has a retainer (140) coupled to the front of a sprocket body (41); and
   a conveyor roller (110) comprising a plurality of rotating balls (111) which are located among a plurality of rotating protrusions (142) protruding forwardly from a retainer body (141) of the retainer (140), an inner wheel body (112) which is fixed to the shaft (50) and has the outer circumferential surface coming into contact with the rotating balls (111), and an outer wheel body (113) which comes into contact with the outer circumferential surfaces of the rotating balls (111) and rotates by the rotation of the rotating balls (111),
   wherein the inner wheel body (112) is fixed to the (50) and does not rotate.

2. The friction roller for conveyer of claim 1, wherein a bearing stopper (41B) protruding in the direction of the shaft (50) is formed along the inner circumferential surface of the sprocket body (41), and a second bearing (130) is installed at a rear end of the bearing stopper (41B).

3. The friction roller for conveyor of claim 2, wherein a first bearing (120) is installed at a front end of the bearing stopper (41B).

4. The friction roller for conveyor of claim 3, wherein a spring(S) supported at a rear end of the inner wheel body (112) is installed, and the rear end of the spring(S) is supported at a front end of the first bearing (130).

5. The friction roller for conveyor of claim 1, wherein a spring(S) supported at a rear end of the inner wheel body (112) is installed, and the rear end of the spring(S) is supported at a front end of the bearing stopper (41B).

6. The fraction roller for conveyor of claim 1, wherein an inclined surface (142A) inclined in the direction of the shaft (50) is formed at both sides of the rotating protrusion (142).

7. The friction roller for conveyor of claim 1, wherein a first curved groove (112) is formed on an outer circumferential surface of the inner wheel body (112), and a second curved groove (113A) is formed on an inner circumferential surface of the outer wheel body (113) along a revolving path of the rotating ball (111).

8. The friction roller for conveyor of claim 1, wherein the retainer (140) is formed from a plastic injection molded material.

9. The friction roller for conveyor of claim 8, wherein the retainer (140) is formed integrally with the sprocket (40) by insert injection molding.

\* \* \* \* \*